United States Patent [19]
Sharp et al.

[11] Patent Number: 5,561,541
[45] Date of Patent: Oct. 1, 1996

[54] FRUSTRATED TOTAL INTERNAL REFLECTION OPTICAL POWER LIMITER

[75] Inventors: Edward J. Sharp, Fort Washington, Md.; Gary L. Wood, Lorton, Va.; Richard R. Shurtz, II, Oakton, Va.; Juergen L. W. Pohlmann, Alexandria, Va.

[73] Assignee: The United States of America as represented by the Secretary of the Army, Washington, D.C.

[21] Appl. No.: 648,140

[22] Filed: Sep. 5, 1984

[51] Int. Cl.$^6$ .................................................... G02F 1/133
[52] U.S. Cl. .................... 359/66; 359/39; 359/69; 359/94; 359/886
[58] Field of Search .................. 332/7.51; 350/105, 350/106, 346, 347 R, 347 V, 340, 351, 354; 359/39, 40, 66, 69, 94, 886

[56] References Cited

U.S. PATENT DOCUMENTS

| | | | |
|---|---|---|---|
| 3,395,961 | 8/1968 | Ready | 350/354 |
| 3,444,478 | 5/1969 | Gudmundser | 350/346 |
| 3,552,824 | 1/1971 | Kiss | 350/354 |
| 3,614,211 | 10/1971 | Letter | 350/346 |
| 3,623,797 | 11/1971 | Daw | 350/351 |
| 3,704,934 | 12/1972 | Holmes et al. | 350/162 R |
| 3,792,916 | 2/1974 | Sarna | 350/348 |
| 4,165,496 | 8/1979 | Domenico et al. | 350/105 |
| 4,540,244 | 9/1985 | Sincerbax | 350/354 |

FOREIGN PATENT DOCUMENTS

| 1208213 | 10/1970 | United Kingdom | 350/312 |
|---|---|---|---|

OTHER PUBLICATIONS

Boff, L.; "Active Optical Filter", May 30, 1979, pp. 1–10, NTIS AD–D006 403/0; Dept. of Army; abst. only provided.

Khao, I. C.; "Optical Thermal Induced TIR... laterfoce" Apr. 15, 1982, pp. 645–7, Appl. Phys. Lett., vol. 40, No. 8.

Smith et al., "Wanigende Nonlinear Laterfoce Devices"; Jun. 1980, F. Opt. Soc. of America, vol. 70, No. 6.

Khao, I. C.; "Theory of Optically Induced... of Light", Phys. Rev A, vol. 25, No. 3, Mar. 1982.

Gibbs et al., "Optical Bistable Devices...", Aug. 1980, Opt. Eng., vol. 19, #4, pp. 463–8.

*Primary Examiner*—Nelson Moskowitz
*Attorney, Agent, or Firm*—Milton W. Lee; Aubrey J. Dunn; Anthony T. Lane

[57] ABSTRACT

In order to protect a delicate photodetector from high-intensity radiation, such as from a laser, a device for limiting optical power to the detector is interposed between the radiation and the detector. This device has an optical interface that totally reflects high-intensity radiation, but which freely transmits normal (low intensity) radiation to the detector. The interface is between two optical materials, one with a linear index of refraction with respect to radiation intensity, and the other with a non-linear index. At low intensity radiation levels, the two materials have the same indices of refraction, and such radiation is freely transmitted through the interface, but with high-intensity radiation, a mismatch of indices of refraction allows total reflection at the interface.

6 Claims, 1 Drawing Sheet

FRUSTRATED TOTAL INTERNAL REFLECTION OPTICAL POWER LIMITER

The invention described herein may be manufactured, used and licensed by the U.S. Government for governmental purposes without the payment of any royalties thereon.

BACKGROUND OF THE INVENTION

This invention is in the field of protective devices for photo-detectors, and is particularly concerned with protecting such detectors against laser countermeasures. The types of detectors being protected include image intensifiers, television camera tubes, infrared detectors, and the human eye. Because of its low damage threshold, the human eye is the most difficult to protect. Various techniques have been used and suggested as protection against laser radiation and other high-intensity radiations, such as searchlights and sunlight. The main techniques so used and suggested include various mechanical and electro-optical shutters, and for narrow-band radiation such as from lasers, absorbing or reflecting interference filters. A recent invention by one of the instant inventors (Shurtz) shows two embodiments of a frustrated total internal reflection limiter wherein high optical power induces thermal effects and is totally reflected away from a detector. This invention bears Ser. No. 492,062 and was filed Apr. 28, 1983.

Unfortunately, these techniques have disadvantages which make them unusable for some detectors and against some high-intensity sources. Specifically, shutters require relatively long times to open and close, compared to the rise time of a pulsed laser. Interference filters, in order to block the spectra of various lasers, must be individually made of each expected threatening laser, and must be stacked in the optical path of the detector. For low-light detection, such stacks cause acceptable attenuation. The Shurtz invention mentioned above is fast acting compared to shutters, and is wide band, but is slow compared to the instant invention.

SUMMARY OF THE INVENTION

The invention is a device for diverting high-intensity optical radiation away from an optical detector. The device includes an optical interface able to totally reflect such radiation, but to transmit freely desired radiation. The interface is between two optical materials, one with a linear index of refraction, and the other with an index dependent on radiation intensity. For normal low intensity radiation, the two materials have the same index of refraction and the interface transmits such radiation. For high-intensity radiation, however, a mismatch of indices results, and total reflection occurs at the interface.

DETAILED DESCRIPTION OF PREFERRED EMBODIMENT

Figure 1:
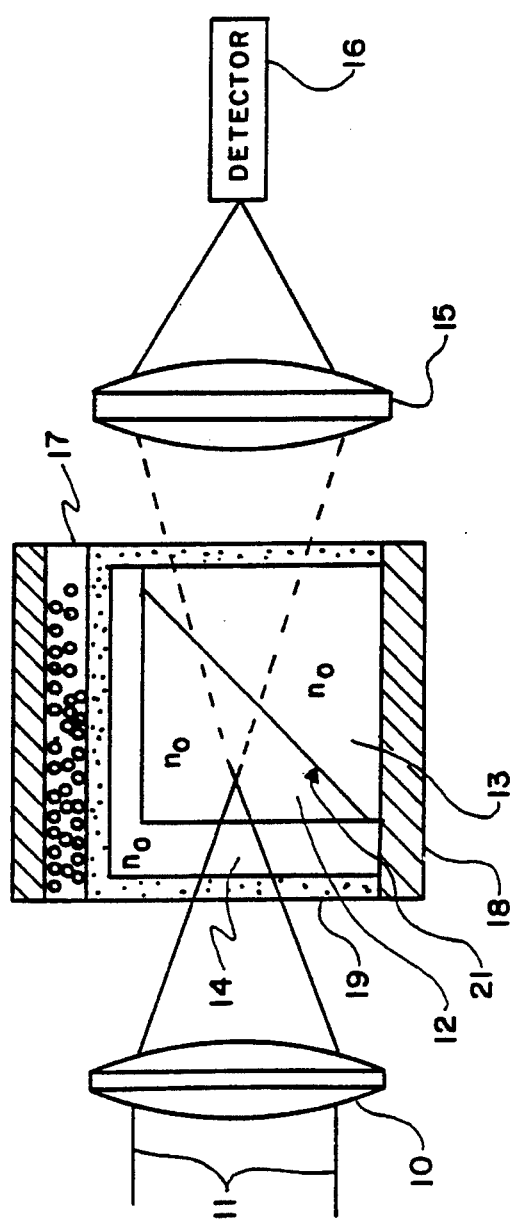
FIG. 1 is a schematic showing of the invention, for low intensity radiation.

The invention may be best understood when this description is taken in conjunction with the drawings, FIG. 1 shows a schematic side view of the invention, partly in section, and not to scale, and includes lens 10 which focusses radiation 11 into material 12. This material is encapsulated between members 13 and 14. All of 12, 13, and 14 are materials transparent to the radiation. For normal (low intensity, i.e., those below a predetermined threshold level) the linear indices of refraction of 12, 13, and 14 are all the same and the radiation passes unattenuated with normal diffraction to lens 15. This lens focusses the radiation onto detector 16. Element 17 is an absorber whose function will be described below, and 18 is a heater used to thermally tune the index of refraction of 12 to match the linear indices of 13 and 14. Layers 19 are conventional antireflection layers.

Figure 2:
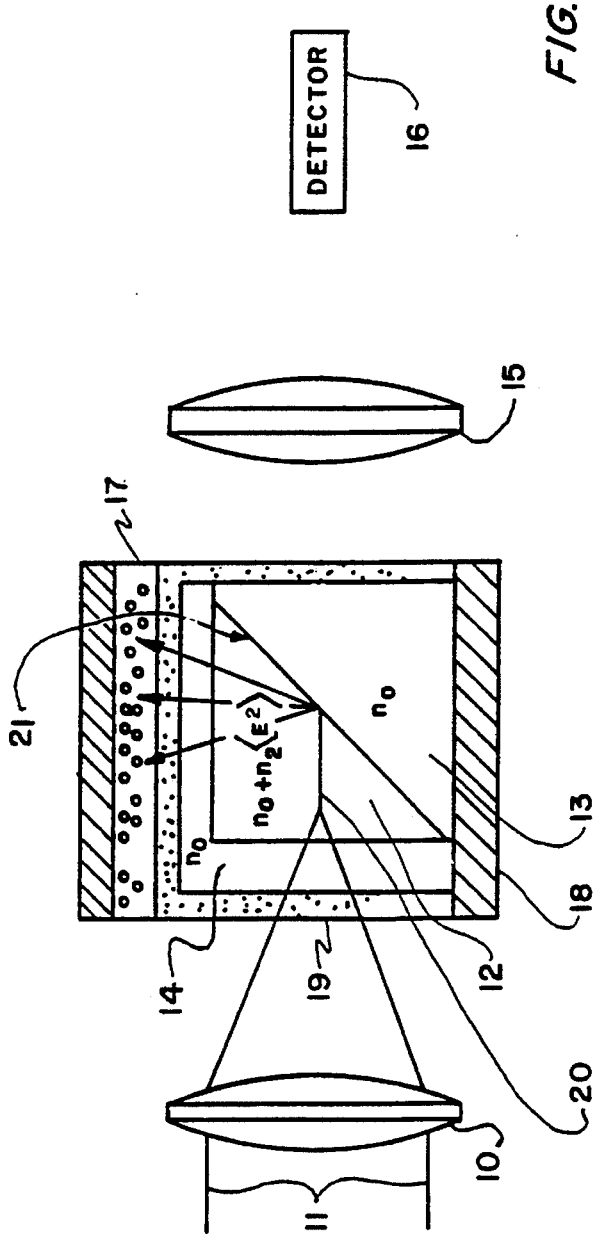
FIG. 2 is a schematic showing of the invention with high intensity radiation.

For high-intensity radiation, we look to FIG. 2. In this figure, the radiation exceeds the critical power for self-focusing and causes an abrupt change in the index of refraction of 12 such that its index becomes $n_o + n_2 <E^2>$, wherein $n_o$ is a linear index of refraction and $n_2$ is positive and is the non-linear index of refraction and $<E^2>$ is the time average of the optical field. The self-focused beam does not spread as a normally diffracted beam, but collapses into a very narrow filament of radiation 20. In this filament the index of refraction of 12 is larger than that of 13 so total internal reflection occurs at the interface 21 between the two materials. In this particular configuration the intense radiation is removed from the optical path of the detector and is safely absorbed by 17. The intensity limit that determines the switching from an unimpedded beam to one that is totally internally reflected can be adjusted by selecting the angle of inclination of the interface to the beam propagation direction, linear index, and nonlinear index.

The foregoing description assumes that $n_2$ is positive. If $n_2$ is positive. If $n_2$ is negative then the device will be fabricated such that material 13 is the nonlinear material with an index equal to $n_o - n_2 <E^2>$ and material 12 will be the linear material having index $n_o$. In this configuration the device works as previously described if the evanescent fields present in material 13 are large enough to sustain the index mismatch between 12 and 13. This requires that materials used for 13 have large negative values of $n_2$ and that the initial focus of the beam by 10 be situated at the interface 21.

The final arrangement of this device has 12 and 13 as both nonlinear materials where 12 is a material with positive $n_2$ and 13 a material with negative $n_2$. In this arrangement the behavior of the device to low intensity radiation is the same as described earlier since 12, 13, and 14 all have linear indices of $n_o$. For high intensities however, the index mismatch between 12 and 13 will be significant since the total index of 12 will increase and the total index of 13 will decrease. Lens 10 will focus the beam into material 12 rather than the interface 21 when this combination of materials is selected for use.

The preferred material for 12 when 12 is the nonlinear material is a liquid crystal, specifically a nematic liquid crystal although any nonlinear optical material with positive values of $n_2$ could be used. The nematic liquid crystals are preferred for this configuration because they possess a temperature dependent nematic-to-isotropic phase transition. They would be used in the isotropic or clear state and the close proximity of the linear index of 1.5 to a number of very good optical materials such as glass, quartz, plastic, etc., makes thermal index matching relatively simple. We have observed very strong optical nonlinearities i.e. large positive $n_2$'s in a number of liquid crystals.

Examplary materials usable in this invention are;

MBBA: N-(p-methoxybenzylidene)-p-butylaniline,

MEBBA: 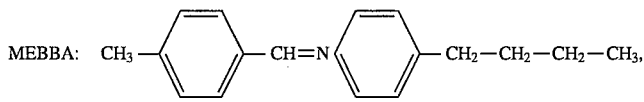

PePMeOB: 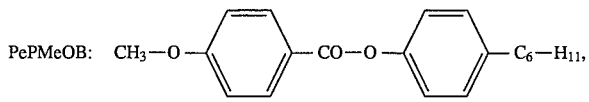

and

BuPPeB: 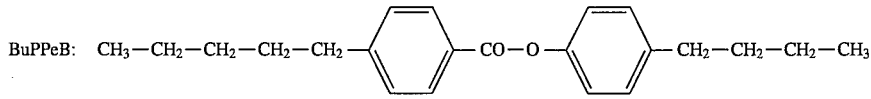

It is assumed as obvious that the linear material 13 in these cases is a solid so that the nonlinear/linear interface 21 is preserved. It is also assumed as obvious in the case of nonlinear (positive $n_2$) material being 12 and the nonlinear (negative $n_2$) material being 13 that one of these materials be a solid. Although not required, it would be preferred that material 12 be the liquid crystal in this case as well, since liquids are less susceptible to permanent damage by self, focused optical beams than are solids.

We wish it to be understood that we do not desire to be limited to the exact details of construction shown and described, for obvious modifications will occur to a person skilled in the art, For example, the device could be constructed as a cube, (as depicted) where the AR-Coatings 19 are different on the three faces to provide index matching of the three faces to their surroundings. Matching on the entry or front face of the device would require index matching of air to $n_o$ of the incapsulating member 14, the rear face of $n_o$ to air and the absorbing face of $n_o$ to the absorber material index. The device may also be constructed as a right circular cylinder with the axis of optical propagation along the axis of the cylinder, Moreover, although we have described only nematic liquids, it should be obvious to one skilled in the art that other types of nonlinear organic and inorganic materials (i.e. nitrobenzene or carbon disulfide) may be used in the invention.

We claim:

1. An optical power limiter for protecting a sensitive optical detector exposed to incident optical radiation, wherein said limiter includes:

first and second materials with a planar interface therebetween at a total reflection angle for said incident radiation, whereby at least one of said materials is a nematic liquid crystal in its isotropic state and which has an index of refraction for said incident optical radiation dependent on the intensity of said optical radiation, wherein said limiter is transparent to optical radiation below a predetermined intensity threshold, but totally reflects, at said interface, optical radiation at or above said predetermined intensity threshold.

2. The limiter as set forth in claim 1 wherein both of said materials have indices of refraction dependent on the intensity of said optical radiation.

3. The limiter as set forth in claim 1 wherein said materials are encapulated in a container having transparent windows for entry and exit of said optical radiation, said windows having linear indices of refraction for said optical radiation.

4. The limiter as set forth in claim 3 additionally including an absorber on said container for absorbing totally reflected radiation.

5. The limiter as set forth in claim 3, additionally including heating means for said materials, whereby said intensity threshold may be varied.

6. The limiter as set forth in claim 4, additionally including heating means for said materials, whereby said intensity threshold may be varied.

* * * * *